Sept. 29, 1970  H. W. WEPRIN ET AL  3,530,636
FILLING APPARATUS AND METHOD
Filed Jan. 17, 1969  5 Sheets-Sheet 1
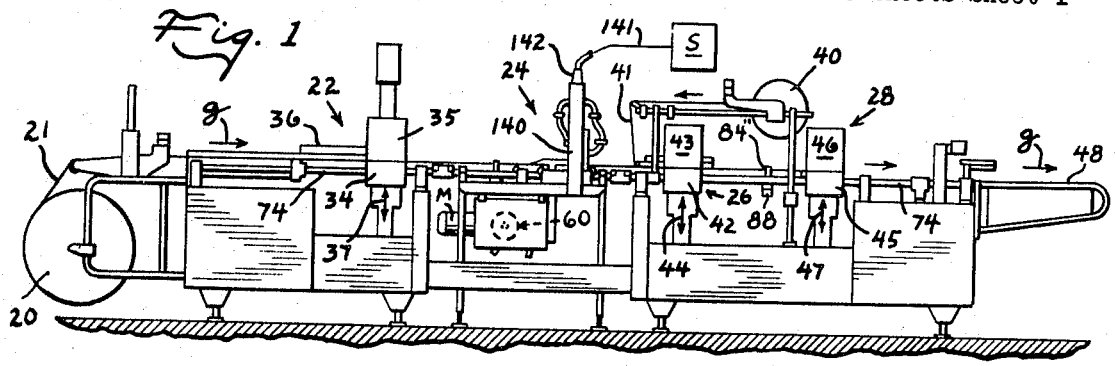
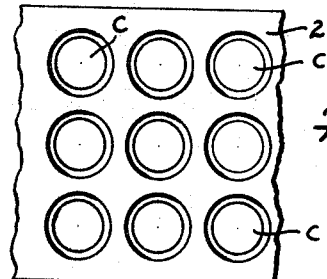
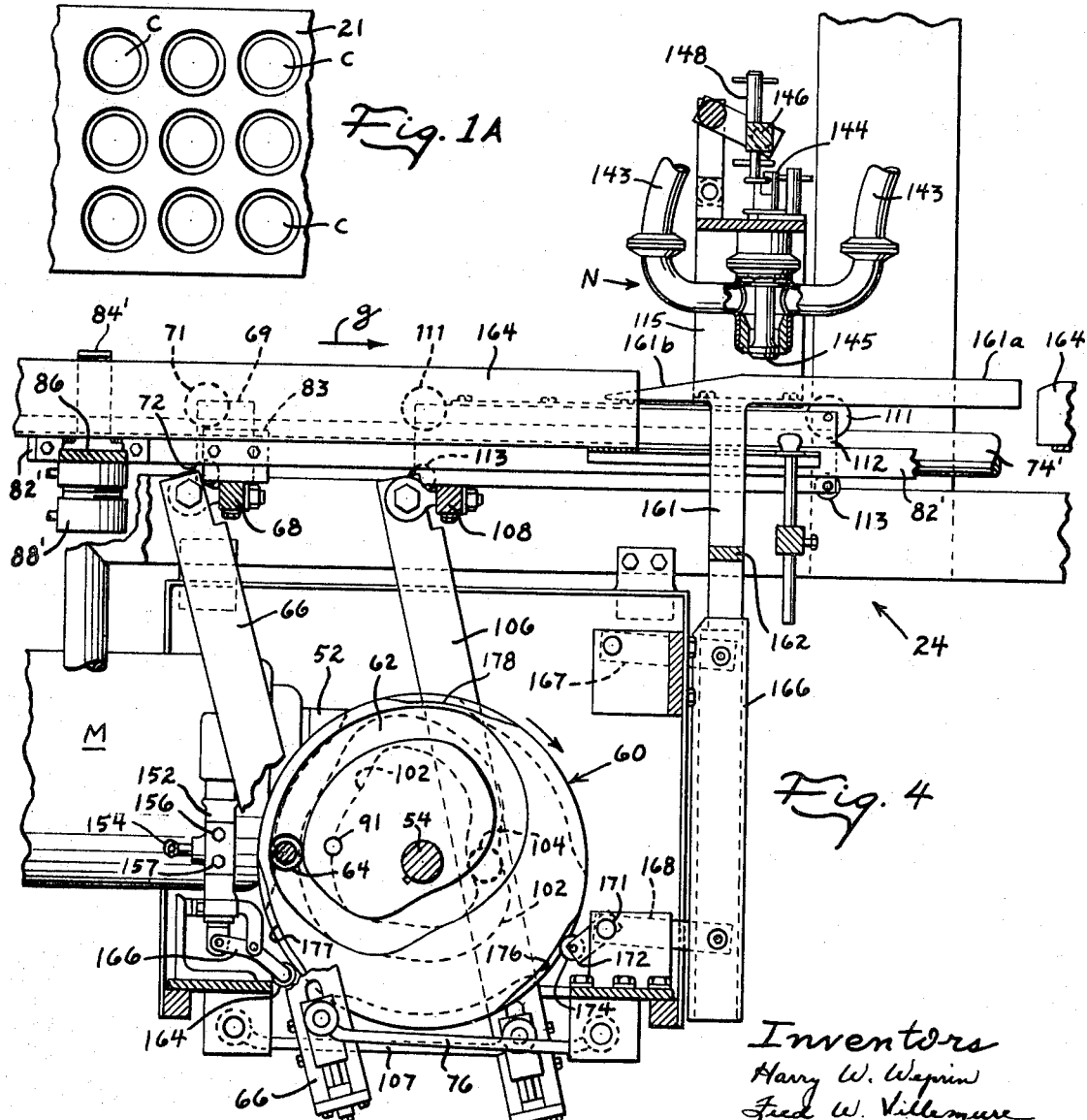
Inventors
Harry W. Weprin
Fred W. Villemure
Roger H. Stolzquist
By McCanna, Morsbach, Pillote & Muir
Attys

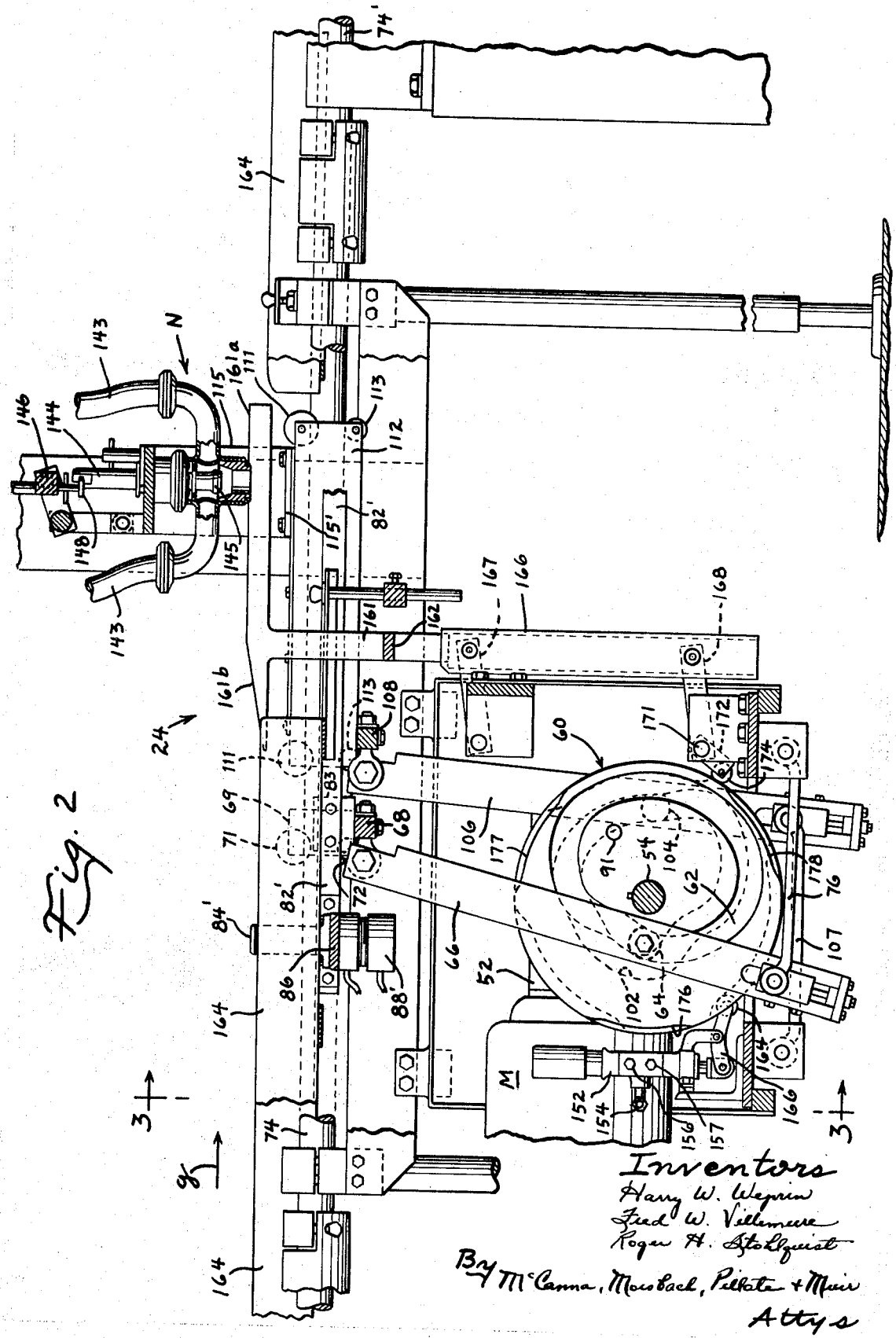

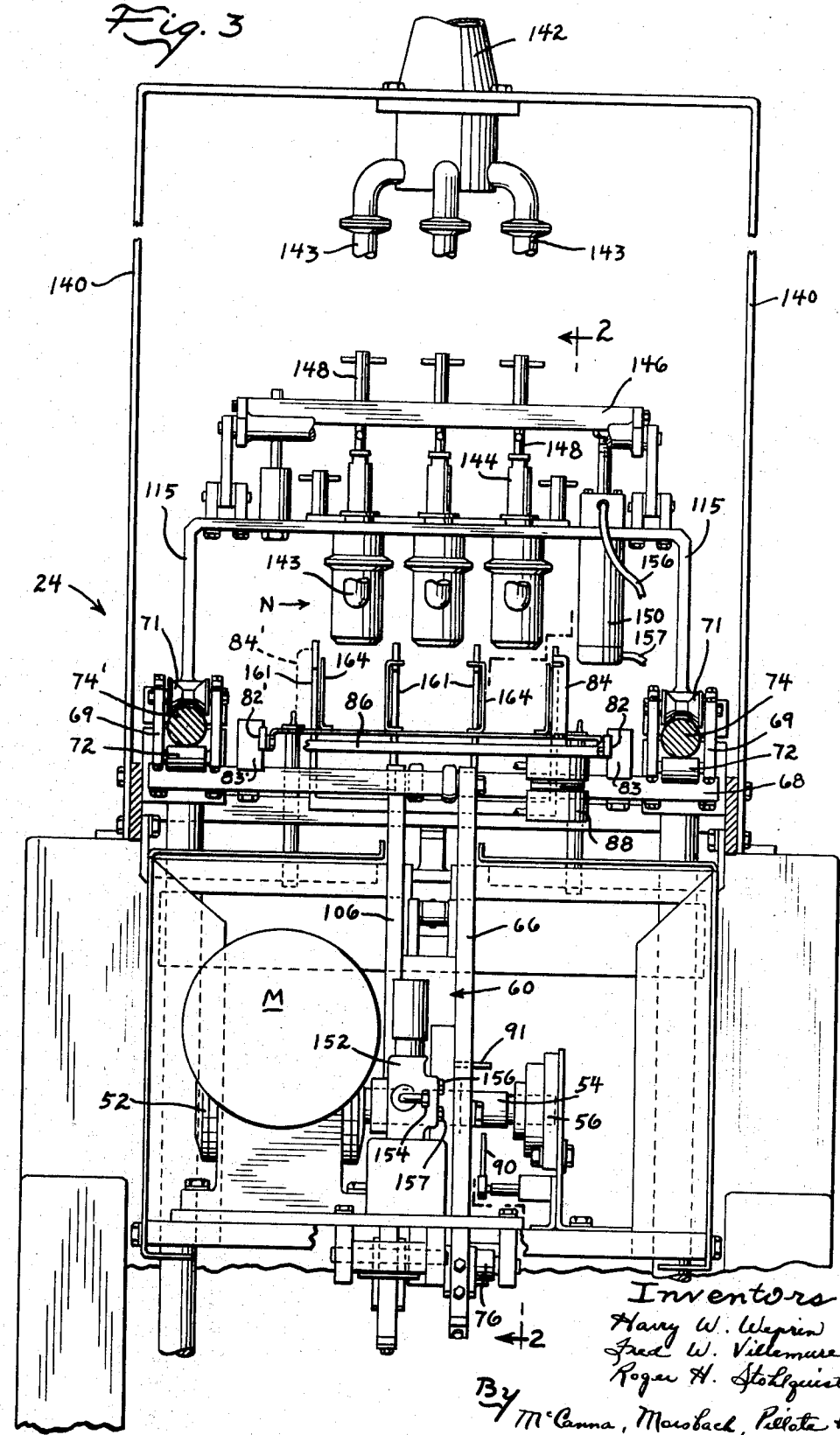

Sept. 29, 1970     H. W. WEPRIN ET AL     3,530,636
FILLING APPARATUS AND METHOD
Filed Jan. 17, 1969     5 Sheets-Sheet 4
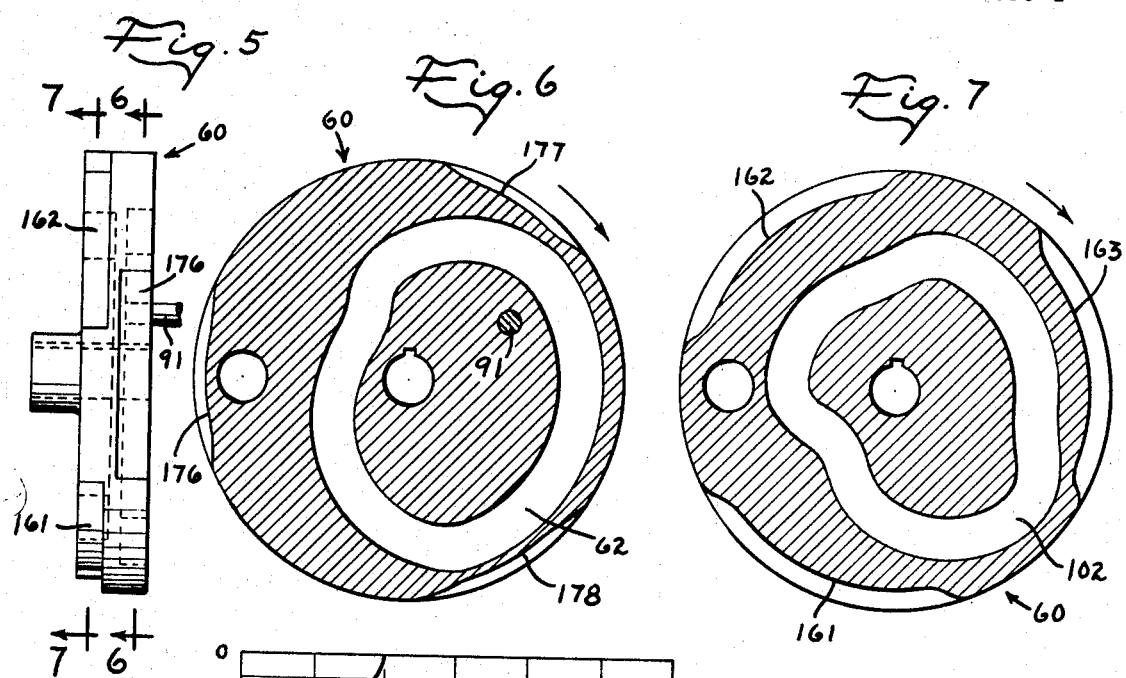
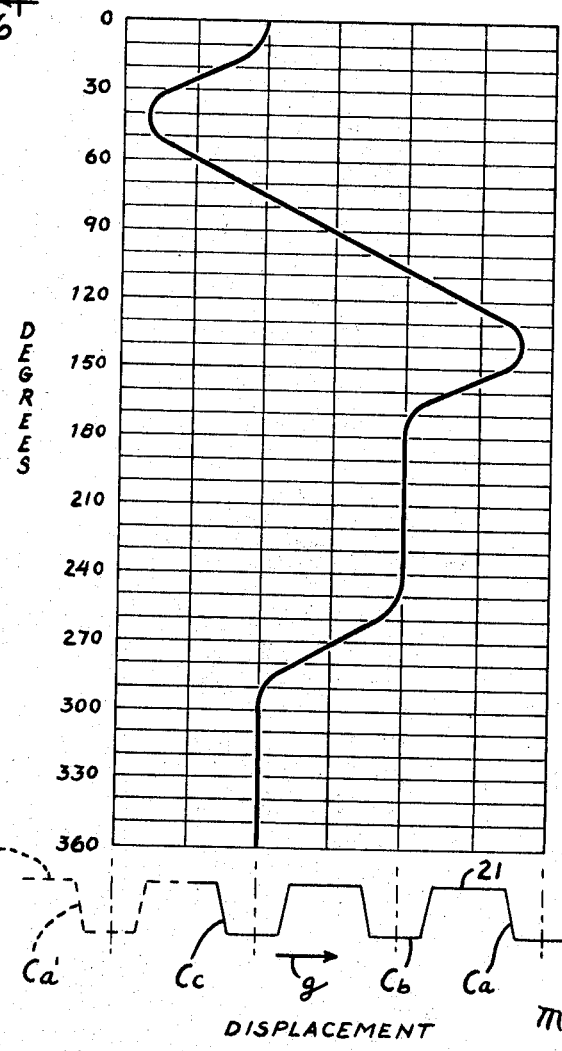
Inventors
Harry W. Weprin
Fred W. Villemure
Roger H. Stohlquist
By
McCanna, Morsbach, Pillote & Maiu
Attys

United States Patent Office 3,530,636
Patented Sept. 29, 1970

3,530,636
FILLING APPARATUS AND METHOD
Harry W. Weprin, Fred W. Villemure, and Roger H. Stohlquist, Rockford, Ill., assignors to Anderson Bros. Mfg. Co., Rockford, Ill., a corporation of Illinois
Filed Jan. 17, 1969, Ser. No. 792,081
Int. Cl. B65b 1/04, 3/12
U.S. Cl. 53—29
20 Claims

ABSTRACT OF THE DISCLOSURE

The apparatus includes a conveyor which intermittently advances a sheet of plastic material past forming, filling, and sealing stations. Nine containers are formed during the dwell period and covers are sealed onto the containers after filling and during a subsequent dwell period. Three nozzles fill nine containers during one cycle of the apparatus by filling three containers while the sheet is advanced and indexing to fill the remaining containers during the dwell period. The drive includes a multi-purpose cam which advances the sheet, indexes the nozzles, controls the fill, and performs other functions incident to the foregoing.

The method includes intermittently advancing a longitudinal row of containers, moving a nozzle along with one of the containers and dispensing a material into the one container as it is advanced, and moving the nozzle in the opposite direction to a position above a second container and dispensing the material into the second container while it is stationary.

BACKGROUND

The invention pertains to the art of packaging. More particularly, the invention pertains to a method and apparatus for dispensing material and coacting with conveying means to supply successive containers.

Some packaging machines are arranged to intermittently advance a plurality of containers. The intermittent advancement may be necessitated by various functions which are performed during the dwell period, such as forming the containers or sealing covers thereto. More particularly, machines are known in which a sheet of plastic material is advanced to a forming station where the container is formed in the sheet and the forming takes a certain length of time. To increase production of such a machine, a multiplicity of containers can be formed longitudinally and crosswise of the web. These containers are usually then filled during a subsequent dwell period by a battery of nozzles equal to the number of containers formed each time. This increases the number of nozzles which must be supplied, cleaned and maintaned. Obviously, the quantity of material supplied during the dwell period must also be increased.

With the above arrangement, the supply is usually stopped during the time the sheet is advanced. Some materials, including compressible materials such as ice cream, may be adversely affected by stopping flow while maintaining pressure on the material. The greater the period of time that flow is stopped the more likely that the material will be damaged.

SUMMARY

The present invention relates to a method and apparatus for dispensing a material into containers which are intermittently advanced by a conveyor. The intermittent advancement provides a period of time when the containers are advanced and a dwell period when they are stationary. The filling operation is performed during both periods.

It is an object of the present invention to provide a method and apparatus for dispensing a material into containers and which requires a lesser number of nozzles than heretofore.

Another object is to provide a method and apparatus for dispensing compressible materials without adversely affecting the material.

Still another object is to provide a method and apparatus in accordance with the foregoing object and where the containers are lowered after filling to separate the material from the nozzle.

Another object is to provide a method and apparatus for dispensing a material into intermittently advanced containers and where the dispensing is accomplished during both the advancement of the containers and the time they are held stationary.

It is yet another object of the present invention to provide a method and apparatus for dispensing a material into a plurality of containers formed in a web with multiple containers both crosswise and longitudinally of the web, and wherein the web is intermittently advanced a distance such that a plurality of containers are advanced past a given point.

Another object is to provide an apparatus for dispensing material into intermittently advanced containers and including a new and useful drive means which advances the containers and indexes the filler.

Still another object is to provide an apparatus in accordance with the foregoing object in which the drive means also controls the flow of the material and raises and lowers the containers.

These, and other objects and advantages of the present invention, will become apparent as the same becomes better understood from the following detailed description when taken in conjunction with the accompanying drawings.

DRAWINGS

FIG. 1 is a front elevational view of an embodiment of the present invention;

FIG. 1-A is a top view of the sheet or web of plastic material showing a plurality of containers simultaneously formed at the forming station.

FIG. 2 is a partial longitudinal sectional view taken generally along broken line 2—2 of FIG. 3;

FIG. 3 is a partial cross-sectional view taken generally along line 3—3 of FIG. 2;

Figure 8:
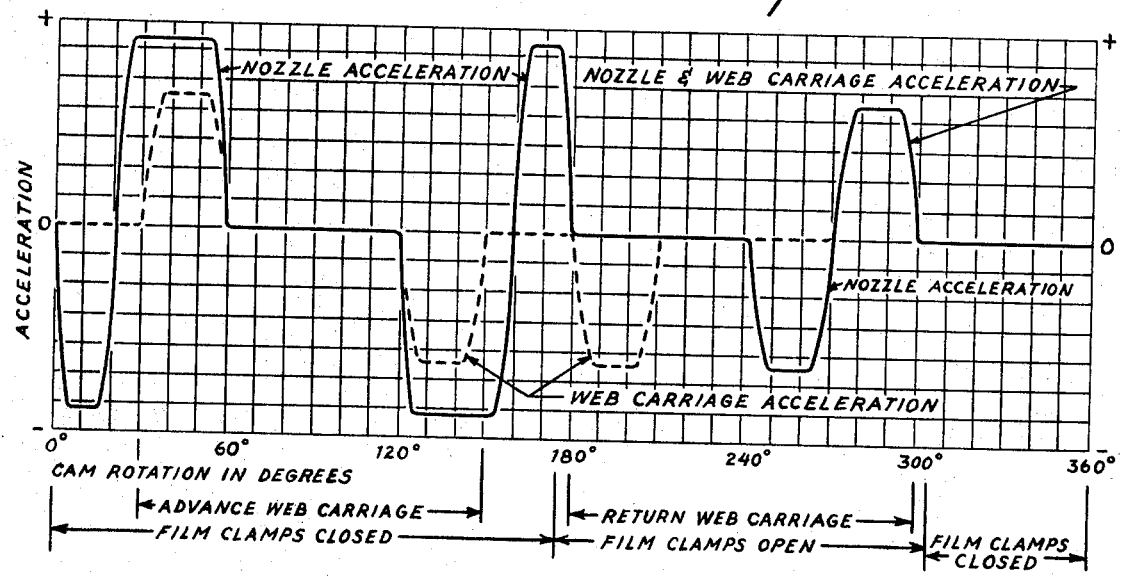
Figure 9:
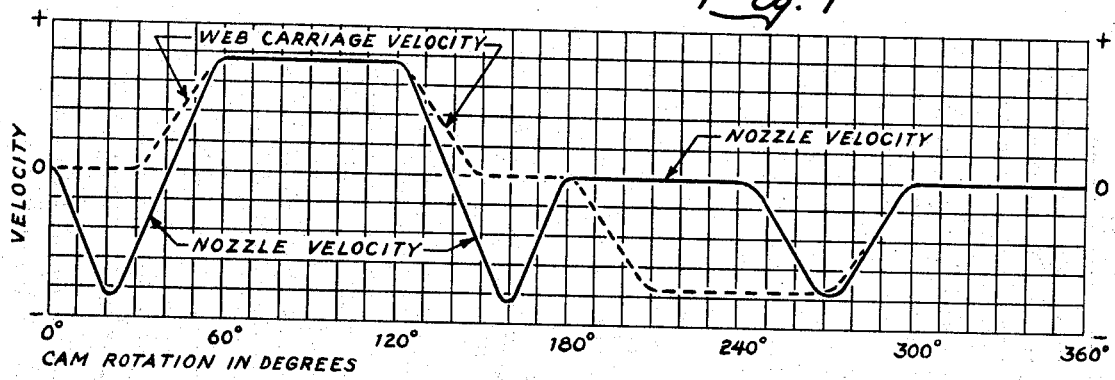
Figure 10:
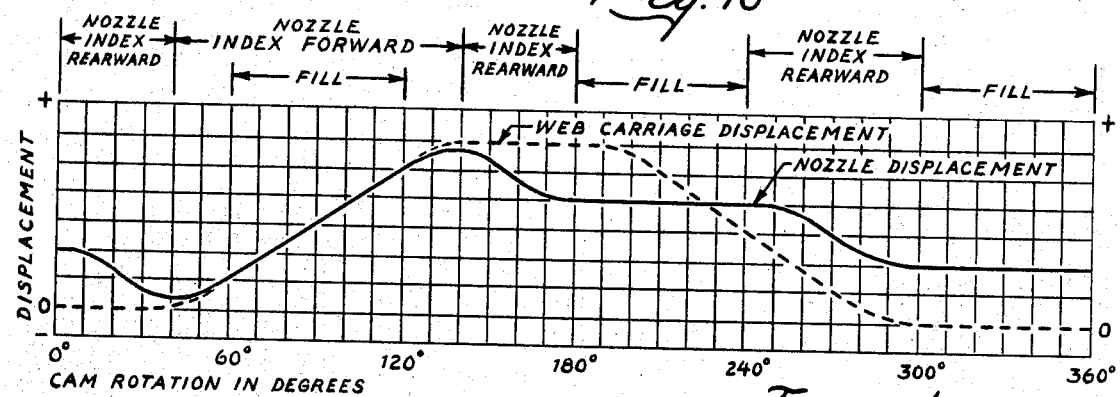

FIG. 4, on sheet one of the drawings, is similar to FIG. 2 but illustrates the relationship of the parts in a different moved position;

FIG. 5 is a view of a cam utilized in the present invention;

FIGS. 6 and 7 are cross-sectional views taken respectively along lines 6—6 and 7—7 of FIG. 5;

FIGS. 8–10 are graphical views illustrating the acceleration, velocity and displacement of the filler and film transport or conveyor; and FIG. 11, on sheet four of the drawings, is a view including a graphical illustration of the filler displacement relative to the degrees of rotation of the multi-purpose cam and also showing the location of the containers.

DESCRIPTION

Reference is now made more particularly to the drawings which illustrate the best presently known mode of carrying out the invention and wherein similar reference characters indicate the same parts throughout the several views.

A machine which incorporates a preferred embodiment of the apparatus of the present invention is illustrated in FIG. 1. This machine is also one suitable apparatus for performing the steps of the method hereafter described. As shown, a roll 20 of material, suitable for forming into containers, is supported at one end of the machine. A web or sheet 21 is withdrawn from the roll and intermittently advanced longitudinally of the machine past successive stations. In the embodiment illustrated, these stations include a forming station 22, a filling station 24, a sealing station 26, and a cutting station 28. The intermittent advancement of the web 21 includes an advancement period and a dwell period; each advancement and dwell comprising one cycle of the machine.

At the forming station 22, a plurality of containers C (see FIG. 1-A) are conveniently formed in the web 21 by means of a mold 34 adjacent one side of the web and pressure adjacent the other side. If desired, vacuum forming may also be utilized. If the web 21 is of thermoplastic material, a heating head 36 is provided at the forming station to heat the web 21 so that it may be formed into any desired shape. A second heating head (not shown) may be disclosed on the bottom side of the web, if desired. In some operations, it is contemplated that cold forming of the web 21 may be accomplished and the heating heads eliminated. Disposed above the mold 34 is an upper member 35. Mold 34 is moved in the direction of arrows 37 between a forming position shown in FIG. 1 and a second position (not shown) removed from the webs so that the web may be intermittently advanced. When pressure forming or vacuum forming is utilized, the mold 34 and upper member 35 provide a generally airtight chamber.

At the filling station 24, a product or material is deposited into the containers C by a novel filling arrangement hereafter described.

A second roll 40 is supported on the machine and a sheet 41 is withdrawn therefrom to be sealed to the container C. Advantageously, a thermoplastic material is selected for sheet 41 which is compatible with web 21, and the sealing may be accomplished by heat sealing. It should be understood, however, that other materials may be utilized and other sealing methods may be used for placing a cover on the container. By way of illustration and not limitation, aluminum foil having a pressure sensitive or heat sensitive coating thereon can be used and the sealing accomplished by the application of heat, or pressure, or both. In the embodiment illustrated, sheet or cover member 41 spans the open end of the container C to provide a cover therefor and to be sealed thereto. The cover member 41 is placed in juxtaposition to the container and these two items are placed into a sealing chamber which includes a lower portion 42 and an upper portion 43. Disposed in the upper portion is a sealing head (not shown) which may be of any type well known in the art. In one embodiment, portions 42 and 43 are movable relative to each other in the direction of arrows 44 to accomplish the sealing operation.

The web containing the sealed packages is then advanced to cutting station 28 where the packages are cut from the web by cutters 45 and 46 which are also movable in the direction of arrows 47. The completed packages are conveniently deposited on a conveyor 48, and the waste portion of the web is fed out of the machine in any convenient manner.

In the above described arrangement, it will be observed that the operations at the forming, sealing and cutting stations are performed during the dwell period of the cycle. The operations at the sealing and cutting stations may be performed other than during the dwell period; however, it is particularly advantageous to do the forming during the dwell period. To do otherwise, the forming mold must be mounted for movement with the web and a plurality of molds used. When moving, synchronism is a problem and the machine contains more apparatus and thus must be larger and more heavily built. Therefore, the most economical arrangement for forming containers in a web is with a sealing station which has portions which move only in a direction perpendicular to the web. Under such circumstance, the web must be held stationary for a "dwell period" during which time the containers are formed. Stopping the advancement of the web for a dwell period has the disadvantage of limiting the production of the machine. To increase the production, it is preferable that a plurality of containers be formed simultaneously at the forming station 22. One example is illutrated in FIG. 1-A which illustrates nine contains C which have been formed simultaneously at the forming station during the dwell period of the machine. As shown, there are a plurality of containers both crosswise and longitudinally of the web 21.

In the past, as explained above, the plurality of containers formed during a dwell period have usually been filled during a subsequent dwell period by a battery of nozzles equal to the number of containers formed each time. Under such circumstance, the supply is usually stopped during the time the sheet is advanced. Some materials, including compressible materials such as ice cream, can be adversely affected by stopping flow while maintaining pressure on the material. The greater the period of time, the more likely that the material will be damaged. In other words, the greater the period of time for advancing the greater the likelihood of damage in some materials to be packaged. Obviously, it takes a greater period of time to advance the web a considerable length than it does for a relatively short length. Thus, the dilemma that as soon as a plurality of containers is formed longitudinally of the web there is a necessity for a greater advancement period which may be undesirable. These problems are overcome by the method of the present invention which will now be described.

At least one longitudinally-extending row of containers C is intermittently advanced in a longitudinal direction $g$ so that the containers are alternately advanced and held stationary for preselected periods of time. A nozzle, generally designated N, is positioned above the row of containers at the filling station 24. The nozzle is moved in the direction $g$ along with one of the containers C and the material is dispensed from the nozzle into the said one container as it is advanced. Thereafter, the nozzle N is moved in a direction opposite the direction $g$ to a position above a second container C and the material is dispensed from the nozzle into the second container.

As explained above, nine containers are advantageously formed at the forming station 22 during each cycle of the machine (see FIG. 1-A). In the illustrated arrangement, there are three containers crosswise of the web 21. Preferably, there is one nozzle N at the filling station 24 corresponding to each container crosswise of the web. Thus there are three nozzles N illustrated in FIG. 3.

Referring now more particularly to FIGS. 2–4, a preferred embodiment of the filling station 24 will be described. As shown, a motor M is mounted on the machine in any convenient manner. The motor is connected to a gear box 52 to rotate a drive shaft 54 which is supported at its outboard end by means of a bearing 56 (see FIG. 3). Mounted on the shaft 54 for rotation therewith is a multi-purpose cam, generally designated 60, and shown in detail in FIGS. 5–7. The multi-purpose cam 60 is arranged to control and synchronize several operations including intermittent advancement of the sheet or web 21, movement of the nozzles N, control of flow through the nozzles, and raising and lowering the web 21.

The multipurpose cam 60 includes an internal cam track 62 to reciprocate the mechanism which intermittently advances the web 21. Cam track 62 is shown in elevation in FIGS. 2 and 4 and in section in FIG. 6. A cam follower 64 is mounted on arm 66 and is disposed in the cam track 62 in the usual manner. The upper end of arm 66 is pivotally connected to a web transfer carriage (sometimes hereafter called web carriage) which includes a cross member 68. At either end of cross member 68 are mounted upright members 69 on which are mounted upper rollers 71 and lower rollers 72. The rollers are engaged with longitudinally extending rails 74, 74'. These rails extend substantially the full length of the machine, as can be seen in FIG. 1, and provide mounting supports for the web carriage. The rails may also conveniently provide mounting supports for other items of the machine such as the forming station 22. The rollers support the web carriage on the rails while the carriage is reciprocated by arm 66. At the lower end of arm 66 is a pitman 76 which has one end pivotally connected to the arm and the other end pivotally mounted on the machine. In this manner, as the cam 60 is rotated, the arm 66 is reciprocated to move the web carriage back and forth along the rails 74 and 74'.

A pair of longitudinal members 82, 82' are mounted onto cross member 68 as by mounting blocks 83, 83', and thus form part of the web transfer carriage. Clamps, such as at 84 (FIG. 3) and 84' (FIGS. 2 and 4) are mounted on a lateral support 86 extending between longitudinal members 82 and 82'. Actuators 88 and 88' are arranged to actuate the clamps 84 and 84', respectively, to grip the web adjacent opposite sides thereof during the time that the web carriage is being advanced. While other types may be used, the actuators 88 and 88' are conveniently pneumatic actuators which are controlled in a manner described below. Preferably, additional grippers and actuators may be mounted on the longitudinal members 82 and 82' to advance or convey the web 21; for example, gripper 84'' and actuator 88'' illustrated in FIG. 1.

As stated above, the actuators 88 and 88' operate the clamps to grip the web during the time that it is advanced. To control the actuators, a pair of limit switches are provided the first of which is shown at 90 in FIG. 3. The first limit switch 90 operates to complete a pneumatic circuit to the actuators when the carriage is at its extreme rearward position as shown in FIG. 4. To trip the first limit switch 90, a pin 91 is mounted on cam 60. A second limit switch (not shown) is operative to open the circuit and release the clamp when the carriage has reached its extreme forward position as illustrated approximately in FIG. 2. This second limit switch may be triggered by pin 91 or by the movement of the web carriage as, for example, engagement by clamp 84''. Reference is made to FIG. 8 which shows the relative times that the switches are tripped and the periods that the clamps are opened and closed. In the above described manner, the cam 60 operates to intermittently advance the web 21 and also controls actuation of the clamps or grippers for the web advancement.

The multi-purpose cam 60 is also operative to index the nozzles N. For this purpose, an internal cam track 102 (best seen in FIG. 7) is arranged at the other side of the cam 60. A cam follower 104 is mounted on a second arm 106 and disposed in the cam track 102 in the usual manner. A second pitman 107 is pivotally connected to the bottom of arm 104 and to the machine. The upper end of arm 106 is pivotally connected to a cross member 108 (see FIGS. 2 and 4). In a manner similar to that described for the web transfer carriage, upper rollers 111 are mounted on rail 74, as best seen in FIGS. 2 and 4. The rollers are carried by side plates 112 on which are mounted lower rollers 113 and the cross member 108. The rollers 111 and 113, along with side plates 112 comprise what is hereafter sometimes called a "transport." An identical transport is provided in conjunction with rail 74' and further description is deemed unnecessary. Extending between the two transports is an inverted U-shaped support 115, best seen in FIG. 3. Support 115 carries the nozzles N and is mounted on the side plates 112 by means of a bracket 115' (see FIG. 2). In this manner, when the multi-purpose cam 60 is rotated the nozzles N are moved to the various desired positions above the containers.

Referring to FIG. 11, the displacement of the nozzles is graphically illustrated for one cycle of the machine. In the illustrated embodiment, there are three longitudinally spaced rows of containers formed during one cycle of the machine. These containers in each row arranged longitudinally of the machine are indicated in FIG. 11 as $Ca$, $Cb$, and $Cc$. Cam track 102 is arranged so that, at the start of a cycle, the nozzle is backed up slightly, as indicated between about 0 and 40 degrees. The nozzle is then advanced along with the advancing first container $Ca$, as illustrated between about 60 and 120 degrees. Filling occurs during this period (see FIG. 10). The nozzle is then backed up, or indexed rearwardly, as indicated to about 180 degrees of the rotation of the cam. By this time, the transfer of the web has been stopped and the nozzle is now located directly above the container $Cb$ to fill the same. In a similar fashion, the nozzle is indexed rearwardly to a position above container $Cc$ to fill that container. This ends a typical cycle of the machine and a succeeding container indicated at $Ca'$ is next in line for the filling operation during the advancement of the web during the next cycle.

FIGS. 8–10 illustrate the correlation between acceleration, velocity, and displacement of the web carriage and the nozzle so that the above described relationship is obtained. The respective accelerations, velocities, and displacements are plotted on the graphs against rotation of the multi-purpose cam 60 in degrees. The design of the cam tracks 62 and 102 is such as to achieve the relationships illustrated in these figures. Referring first to FIG. 10, there is illustrated the displacement of the nozzle, described above in connection with FIG. 11, in relationship to the displacement of the web carriage. It can be seen that in the period between approximately 60 degrees and 120 degrees rotation of the multi-purpose cam 60 the displacement of the nozzle and web carriage is identical. This permits the filling of the containers $Ca$ during the advancement. It can also be seen that the web carriage is returned to its initial position during the time that the nozzle is being indexed rearwardly and is filling the succeeding containers $Cb$ and $Cc$. In FIG. 9 there is graphically illustrated the respective velocities of the nozzle and the web carriage. Attention is directed to the fact that the velocity is both identical and uniform during the period that the containers $Ca$ is being filled. This effectively eliminates any danger of splashing or spilling of the material being dispensed. FIG. 8 is the acceleration diagram of the nozzle and of the web transport carriage. FIG. 8 also indicates the periods that the film clamps are open and closed, and that the web transport carriage is advanced and returned. The displacement diagram (FIG. 10) can also be referred to in conjunction with movement of the web transport carriage.

Material to be packaged is fed to the filling station 24 through a conduit 141 from a remote source S (see FIG. 1). If the material is ice cream or the like, the source S may be refrigerated. A distributor 142 is mounted at the filling station as by bracket 140. The distributor 142 is connected to the conduit 141 and to a plurality of conduits 143 leading to the nozzles N. As shown in FIGS. 2 and 4, there may be two conduits 143 for each nozzle N to help equalize the flow thereto. Flow through the nozzles then is controlled by a valve 145 on valve stem 144. Each valve stem 144 extends through the inverted U-shaped bracket 115, as shown. Each valve stem 144 is connected to a cross bar 146 by means of an adjustable connector 148. The cross bar 146 is movable between a raised position (FIGS. 2 and 3) to open valve 145 and permit flow through the nozzle N, and a lower position (FIG. 4) to close valve 145 and prevent flow through the nozzle. An actuator 150, conveniently of the pneumatic type, is provided for moving the cross bar 146 between its positions and thereby controlling flow through the nozzles N (see FIG. 3). The actuator 150 is under control of a two-position valve 152 positioned adjacent the multi-purpose cam 60. Two-position valve 152 receives air through inlet 154 and distributes it through either conduit 156 or 157 which lead to actuator 150.

The multi-purpose cam 60 is also arranged to control the two-position valve 152 and thereby control flow of material through the nozzle N. For this purpose, multi-purpose cam 60 is provided with a plurality of recesses 161–163 (see FIG. 7). A cam follower 164 is mounted on an arm 166 which is attached to the two-position valve 152 to move the same between its two positions. Thus, as the multi-purpose cam 60 rotates, the cam follower 164 will ride between the periphery of the cam and the recesses and control the flow through the nozzles N.

When material such as ice cream is being dispensed, there is a certain amount of cohesion between the product and the nozzles N. Under such circumstance, it is preferable to move the containers C downwardly from the nozzles to break this cohesion and separate the material from the nozzles. This eliminates smearing of the material over the adjacent packages and also eliminates drippage. For this purpose, means is provided for lifting the containers closely adjacent the bottom of the nozzles N during the time that they are filled and then lowering the containers after filling. Since the containers are in a web 21, a lifting device is arranged for lifting the web to lift the containers. For this purpose, a plurality of generally T-shaped members 161 are mounted on a cross member 162 and are movable between an upper position as shown in FIG. 2, and a lower position shown in FIG. 4. The T-shaped members have a generally horizontal upper surface 161a and an inclined surface 161b. Surface 161a, when in the lower position (FIG. 4), provides a continuation of web supports 164 which engage the underside of the web both intermediate the containers and at the edges of the web (see FIG. 3). When in the raised position, inclined surface 161b provides a transition from the upper surface of support 164 to the surface 161a, as best seen in FIG. 2.

Means is provided for raising and lowering the T-shaped members 161 and this means is operated by the multi-purpose cam 60. As shown in FIGS. 2 and 4, cross bar 162 is secured to an upright 166 which, in turn, is pivotally mounted on the machine by means of links 167 and 168. Link 168 is secured to a rotatable shaft 171 closely adjacent the multi-purpose cam. Another link 172 is also secured to shaft 171 and carries a cam follonwer 174 which engages the multipurpose cam 60. Cam 174 rides on the periphery of the multipurpose cam 60 and into recesses 176–178 provided on the periphery thereof and best shown in FIG. 6. When the cam follower 174 is in one of the recesses, the members 161 are in their lower position and when the cam follower rides upwardly to the periphery of the cam, the T-shaped members 161 are moved to their raised position (FIG. 2) and thus raise the web and containers.

Thus it has been seen that the multi-purpose cam 60 operates mechanically to transfer or convey the web 21, to transfer or index the nozzles N, to control flow of material through the nozzles N, and to raise the containers during the filling operation and lower them after fill has been completed.

It is now deemed obvious that the method and apparatus of the present invention accomplishes dispensing of material into a plurality of intermittently advanced containers both during the time that the containers are advanced and during the time that they are held stationary. This allows filling of a plurality of containers wtih a lesser number of nozzles than would otherwise be required, reduces the rate of flow of material to the nozzles, and reduces the length of time that flow is ceased intermediate filling of the containers.

While specific steps of the method have been described, along with a preferred embodiment for performing the method, this has been done by way of illustration and not limitation, and it is to be understood that various modifications both in the method and in the structure will occur to a person skilled in the art.

What is claimed is:

1. A method of dispensing a material into containers including the steps of:
    alternately advancing a longitudinal row of containers in one longitudinal direction and holding the containers stationary for preselected periods of time;
    positioning a nozzle above the row of containers;
    moving the nozzle in said one direction along with one of the containers and dispensing the material from the nozzle into the one container as it is advanced; and
    moving the nozzle in a direction opposite said one direction to a position above a second container and dispensing the material from the nozzle into the second container while it is stationary.

2. A method of dispensing a material into containers as set forth in claim 1 including moving the nozzle in said opposite direction to a position above a third container and dispensing the material from the nozzle into the third container while it is stationary.

3. A method of dispensing a material into containers as set forth in claim 1 including raising the one container during at least a portion of the time it is advanced and the material is dispensed and lowering the one container after the material is dispensed; and raising the second container during at least a portion of the time it is stationary and the material is disenpsed and lowering the second container after the material is dispensed.

4. A method including the steps of:
    intermittently advancing a longitudinal sheet of plastic material past a forming station and a filling station so that the sheet is alternately advanced and held stationnry;
    forming a plurality of containers longitudinally of the sheet while the sheet is held stationary at the forming station;
    dispensing a material into at least one of the containers through a nozzle at the filling station while the sheet is being advanced; and
    dispensing the material through the same nozzle into at least another of the containers while the sheet is stationary.

5. A method as set forth in claim 4 wherein the step of intermittent advancing the sheet includes intermittently advancing the sheet through generally equal time cycles consisting of an advancement period and a stationary period; wherein the material dispensed is a compressible semi-solid material; and including the step of dividing the cycle time so that the dispensing times are generally equal and the times between dispensing are generally equal.

6. A method as set forth in claim 5 including raising the sheet so that the one container is raised during the time the material is dispensed and lowering the sheet thereafter to separate the material from the nozzle; and raising the sheet so that the other container is raised during the time the material is dispensed and lowering the sheet thereafter to separate the material from the nozzle.

7. A method including the steps of:
    intermittently advancing a longitudinal sheet of plastic material past a forming station and a filling station through generally equal time cycles consisting of an advancement period and a stationary period;
    forming a plurality of containers at the forming station during one stationary period, the containers formed in each such period being arranged in rows extending longitudinally of the sheet and columns extending crosswise thereof;
    providing at the filling station a plurality of nozzles crosswise of the sheet and equal to the number of containers in each crosswise column;
    dispensing a material through each nozzle into its respective container in one column during an advancement period subsequent to the one stationary period to fill the containers in the one column; and dispensing the material through the same nozzles into each successive column of containers during a subsequent stationary period to fill the remaining columns of containers in the longitudinal row formed during the one stationary period;

whereby the number of containers filled during each cycle equals the number formed during the stationary period of each cycle.

8. In an apparatus including means for intermittently advancing a longitudinal web of packaging material in one direction past a forming station and a filling station so that the web is alternately advanced and held stationary for preselected periods of time, one advancement period and one stationary period comprising a cycle of the machine, and forming means at the forming station for forming a plurality of containers longitudinally of the web during the stationary period, the improvement comprising: a filler at the filling station including a nozzle disposed above the web of containers, means mounting the nozzle above the web for movement in said one direction and a direction opposite thereto, indexing means for moving the nozzle along with a first container during at least a portion of the advancement period and for holding the nozzle stationary above a second container longitudinally spaced from the first container during at least a portion of the stationary period, means for supplying a material to be discharged through the nozzle, and valve means for controlling the discharge of the material when the nozzle is moving with the first container and when the nozzle is stationary above the second container.

9. The combination of claim 8 including means for supplying a generally compressible semi-solid material to the nozzle; and means for actuating the valve means to provide a plurality of generally equal dispensing periods separated by non-dispensing periods being of generally equal duration.

10. The combination of claim 9 including means for raising the web during each period to raise each container more closely adjacent the nozzle and for lowering the web after discharge is ceased to separate said material from the nozzle.

11. The combination of claim 8 wherein the forming means is operative to form at least three containers longitudinal of the web, wherein the indexing means is operative to move the nozzle in a direction opposite said one direction during the stationary period to a position above a third container longitudinally spaced from the first and second containers, and wherein the valve means controls the discharge of material through the nozzle into the third container during the stationary period.

12. The combination of claim 8 wherein the forming means is operative to form a plurality of containers crosswise of the web as well as longitudinally thereof, wherein the filler includes a nozzle for each container crosswise of the web, and wherein the indexing means moves the nozzles in unison in said one direction and said opposite direction.

13. In combination, conveyor means for intermittently advancing a longitudinal row of generally equally spaced containers in one direction past a filling station so that the containers are alternately advanced and held stationary for preselected periods of time; a filler including a nozzle having a discharge opening adapted to be positioned vertically above a respective one of the containers, means mounting the nozzle for movement in said one direction and a direction opposite thereto; indexing means for moving the nozzle from a beginning point in said one direction at approximately the same velocity as the conveyor means during at least a portion of the advancement of the containers to maintain the discharge opening vertically above a first container, for holding the nozzle with the discharge opening vertically above a second container longitudinally spaced from the first container during at least a portion of the stationary period, and for moving the nozzle back to the beginning point; means for supplying a material to be discharged through the discharge opening; and valve means for controlling the discharge of the material when the discharge opening is vertically above the first and second containers to fill the same.

14. The combination of claim 13 wherein the indexing means moves the nozzle in the opposite direction to a position with the discharge opening vertically above a third container during a portion of the stationary period; and wherein the valve means controls discharge of the material into the third container.

15. The combination of claim 13 wherein the conveyor means includes a container transfer mechanism moveable in said one direction to advance the containers and movable in the opposite direction during the stationary period of the containers, and including drive means for driving the container transfer mechanism and the indexing means so that the nozzle and containers are advanced at the same velocity during the advancement period and so that the nozzle and container transfer mechanism are moved in the opposite direction during the stationary period.

16. The combination of claim 15 wherein the drive means includes a motor and cam means driven by the motor for driving the container transfer mechanism and the indexing means, and the cam means also controls actuation of the valve means to control discharge of the material.

17. The combination of claim 15 including means for forming a plurality of the containers in a web of plastic material during the stationary period and wherein the drive means is operative to lift the web of container during filling thereof and to lower the web after filling.

18. The combination of claim 15 including means for forming a plurality of the containers in a web of plastic material during the stationary period, and wherein: the drive means includes a motor and cam means driven by the motor for driving the container transfer mechanism and the indexing means, the container transfer mechanism includes grippers for gripping the web adjacent the sides thereof, and the cam means also controls actuation of the grippers to grip the web.

19. The combination of claim 18 including a web lifting mechanism, and wherein the cam means controls operation of the web lifting mechanism to lift the web of containers during filling of the containers and to lower the web after filling, and the cam means also controls actuation of the valve means to control discharge of the material.

20. The combination of claim 15 wherein the drive means includes a motor and cam means driven by the motor, the container transfer mechanism includes a cam follower engaged with the cam means to reciprocate the container transfer mechanism as the cam means is driven, the index means includes a cam follower engaged with the cam means to index the nozzle as the cam means is driven, and the cam means being operative to control actuation of the valve means to control discharge of the material.

References Cited

UNITED STATES PATENTS

| | | | |
|---|---|---|---|
| 2,757,844 | 8/1956 | Greissman | 141—137 |
| 3,328,937 | 7/1967 | Newman et al. | 53—184 X |

TRAVIS S. McGEHEE, Primary Examiner

E. F. DESMOND, Assistant Examiner

U.S. Cl. X.R.

53—184, 282; 141—137, 167

PO-1050
(5/69)

UNITED STATES PATENT OFFICE
CERTIFICATE OF CORRECTION

Patent No. 3,530,636      Dated September 29, 1970

Inventor(s) Harry W. Weprin, Fred W. Villemure & Roger H. Stohlquist

It is certified that error appears in the above-identified patent and that said Letters Patent are hereby corrected as shown below:

Column 8, line 29, "disenpsed" should be -- dispensed -- as shown in Claim 3, line 7, of the application;

Line 35, "stationnry" should be -- stationary -- as shown in Claim 4, line 5, of the application.

Column 9, line 37, after "periods" (second occurrence) should be inserted -- with successive non-dispensing periods -- as shown in Claim 9, line 5, of the application;

Line 40, after "each" should be inserted -- discharge -- as shown in Claim 10, line 2, of the application.

SIGNED AND
SEALED
DEC 15 1970

(SEAL)
Attest:

Edward M. Fletcher, Jr.
Attesting Officer

WILLIAM E. SCHUYLER, JR.
Commissioner of Patents